No. 701,946. Patented June 10, 1902.
H. DE W. SAWYER.
TILTING WATER GRATE.
(Application filed July 6, 1897. Renewed Nov. 12, 1901.)

(No Model.)

WITNESSES.
Matthew M. Blunt.
N. K. Baker.

INVENTOR.
Howard De W. Sawyer
by A. W. Bennett
ATT'Y.

UNITED STATES PATENT OFFICE.

HOWARD DE W. SAWYER, OF REVERE, MASSACHUSETTS.

TILTING WATER-GRATE.

SPECIFICATION forming part of Letters Patent No. 701,946, dated June 10, 1902.

Application filed July 6, 1897. Renewed November 12, 1901. Serial No. 82,044. (No model.)

*To all whom it may concern:*

Be it known that I, HOWARD DE WOLFE SAWYER, of Revere, in the county of Suffolk and State of Massachusetts, have invented certain new and useful Improvements in Tilting Water-Grates, of which the following, taken in connection with the accompanying drawings, is a specification.

The object of this invention is to provide for downward-draft stoves and other forms of heating apparatus a tubular water-containing tilting grate, through which and the bearings therefor a current of water may be maintained during use of the grate and while it is being dumped for removal of cinders or clinkers. By this improvement the grate-bars are preserved for years against burning out, although exposed to the most intense heat, and the water circulating through them is raised to a high temperature and still provision is made for dumping whenever required.

My invention is embodied in a tubular grate provided with tubular trunnions and hollow bearings therefor, connected with inlet and outlet pipes for water circulation under pressure through said parts. One form of such grate has the ends of its parallel grate-bars connected to larger marginal or end tubes, from which, centrally and laterally, the hollow tapering trunnions project through hollow balls forming bearings fixed on the ends of the inlet and outlet pipes. The openings through these balls are tapered to fit the trunnions and tightening-nuts are provided at the closed outer ends, while a lateral aperture in each trunnion opens a waterway through the cavity in the ball, so that circulation is unimpeded. Lateral yielding of the pipes on which the bearings are fixed will compensate for any elongation of the grate by the heat.

Figure 1:
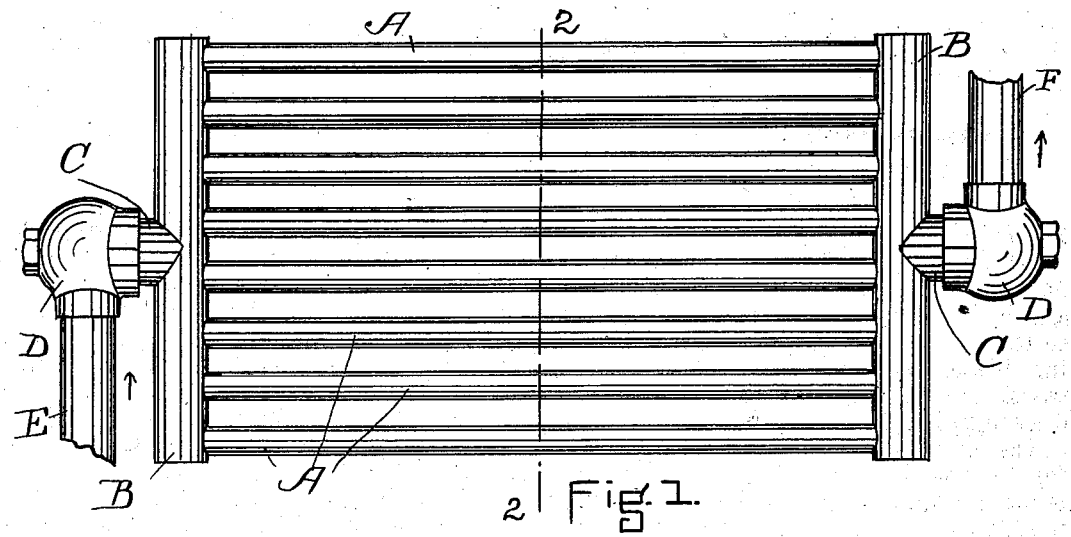
Figure 2:
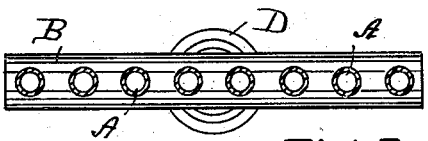
Figure 3:
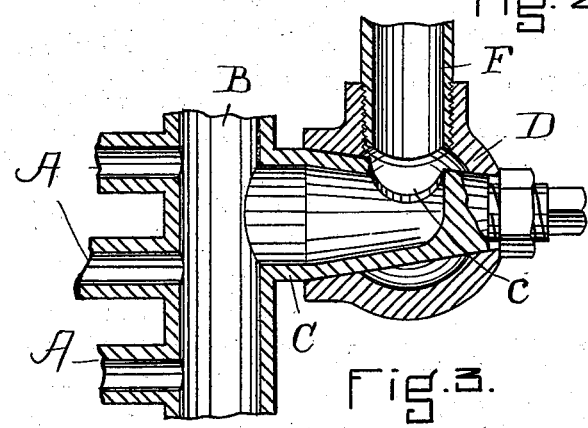
Figure 4:
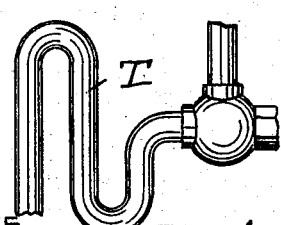
Figure 5:
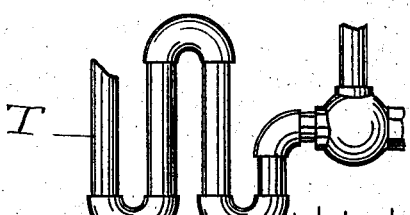

In the drawings, Figure 1 is a plan of one of my improved grates and its bearings; Fig. 2, a transverse section on line 2 2 of Fig. 1; Fig. 3, an enlarged section through the bearing-trunnion and adjacent portion of the grate. Figs. 4 and 5 show modified forms of grate.

A represents the parallel tubes forming hollow grate-bars, and B the larger tubular ends of the grate, into which the tubes A open. C C are hollow tapering trunnions projecting outwardly through the stove-walls from each end of the grate about centrally to constitute journals on which it may be oscillated.

The grate may be cast entire or the end tubes and their respective trunnions cast in one and the tubular bars A screwed into place by right and left hand screws or the parts otherwise united. It may in some cases facilitate insertion and removal of the grate if the trunnions are made separate and screwed into a boss on the end tubes B after the body of the grate is in position in the stove.

As shown in Figs. 1 and 3, the bearings for the grate consist of hollow balls or water-boxes D, mounted on the ends of the inlet-pipe E and outlet-pipe F. These pipes stand at right angles to the axis of the grate and yield laterally with any variations in length of the grate due to the heat. The walls of the apertures through these balls taper to correspond with the trunnions to provide a water-tight joint. A lateral opening *c* through the tapering wall of the trunnion into the concavity of the ball D gives a free passage for water, thus insuring a current through the grate at all times. The end of the trunnion is closed, externally threaded, and provided with a nut bearing against the ball. One of the trunnions will be prolonged and squared to receive a crank, by which the grate may be tilted. (See Fig. 3.) The grate may, however, be formed of a sinuously-bent tube T either of a single continuous length or of successive short lengths joined by return-bends and with open frustoconical ends entering tapering sockets, as indicated in the modifications, Figs. 4 and 5.

I claim as my invention—

1. A tilting, tubular, water-containing grate provided with hollow trunnions formed with a water-passage through them, in combination with hollow bearings for said trunnions inclosing and communicating with said water-passages and with inlet and outlet pipes at the opposite ends of said grate, terminating in said bearings, and arranged at right angles to the axis of the grate, so as to yield laterally, to provide for expansion and contraction of the grate, and connected to a water-supply under pressure, whereby a water-current through the grate is maintained, substantially as set forth.

2. A tilting, tubular, water-containing grate consisting of a hollow grate-body provided at its ends with central, projecting, tapering trunnions having a lateral water-passage through their tapering walls, in combination with pressure inlet and outlet pipes at the opposite ends of said grate, at right angles to its axis, to provide for expansion and contraction of the grate, and with hollow bearings mounted on said pipes, formed with tapering apertures to receive and fit upon said trunnions and inclose said water-passages, and with a nut on each trunnion adjacent to its bearing and adapted to tighten the joint, substantially as set forth.

In testimony whereof I have signed my name to this specification in the presence of two subscribing witnesses.

HOWARD DE W. SAWYER.

Witnesses:
 A. H. SPENCER,
 D. W. WORMWOOD.